US012544297B2

United States Patent

(12) United States Patent
Mauffrey et al.

(10) Patent No.: US 12,544,297 B2
(45) Date of Patent: Feb. 10, 2026

(54) MOTOR VEHICLE SEAT

(71) Applicant: Faurecia Autositze GmbH, Hannover (DE)

(72) Inventors: Jean-Marie Mauffrey, Champagney (FR); Didier Duriez, Le Plessis-Paté (FR); Piotr Ceglarek, Katowice (PL); Jacek Lasak, Jaroszów (PL)

(73) Assignee: Faurecia Autositze GmbH, Hannover (DE)

( * ) Notice: Subject to any disclaimer, the term of this patent is extended or adjusted under 35 U.S.C. 154(b) by 919 days.

(21) Appl. No.: 17/718,507

(22) Filed: Apr. 12, 2022

(65) Prior Publication Data

US 2022/0339056 A1 Oct. 27, 2022

(30) Foreign Application Priority Data

Apr. 24, 2021 (DE) ......................... 102021110529.3

(51) Int. Cl.
*A61H 9/00* (2006.01)
*B60N 2/90* (2018.01)

(52) U.S. Cl.
CPC ........... *A61H 9/0078* (2013.01); *B60N 2/976* (2018.02); *A61H 2201/1695* (2013.01); *A61H 2203/0431* (2013.01)

(58) Field of Classification Search
CPC .......... A61H 7/00; A61H 7/001; A61H 7/007; A61H 9/00; A61H 9/0007; A61H 9/005; A61H 9/0078; A61H 9/0092; A61H 2201/0103; A61H 2201/0119; A61H 2201/0138; A61H 2201/0149; A61H 2201/1602; A61H 2201/16; A61H 2201/1623; A61H 2201/1633; A61H 2201/1628; A61H 2203/0425; A61H 2203/0431; A61H 2205/081; A61H 2205/086; A47C 23/047; A47C 27/18; B60N 2/914; B60N 2/665; B60N 2/976
See application file for complete search history.

(56) References Cited

U.S. PATENT DOCUMENTS 4,516,568 A * 5/1985 Baxter ...................... A61F 5/01 606/240
4,622,706 A * 11/1986 Takeuchi ........... A61G 7/05776 601/150
6,129,419 A * 10/2000 Neale ....................... B60N 2/58 297/284.6
6,440,092 B1 * 8/2002 Leventhal .............. A61H 23/02 601/84

(Continued)

FOREIGN PATENT DOCUMENTS

DE 102019206830 A1 11/2020

*Primary Examiner* — Colin W Stuart
(74) *Attorney, Agent, or Firm* — Laurence P. Colton; Smith Tempel Blaha LLC

(57) ABSTRACT

A motor vehicle seat, having a seat massage system which has one, or a plurality of, fluid-fillable massage bladder(s), and a cushion which has a first side facing the seat occupant and a second side opposite the first side. The massage bladder(s) is/are arranged on the second side of the cushion such that filling the massage bladder(s) causes a pressure of the filled massage bladder(s) on pressure regions of the cushion and thus a deformation of the cushion. At least one of the pressure regions is surrounded by a recess present in the cushion.

12 Claims, 4 Drawing Sheets

(56) References Cited

U.S. PATENT DOCUMENTS

| | | | | |
|---|---|---|---|---|
| 9,149,125 | B2 * | 10/2015 | Davis | A61H 9/0078 |
| 11,076,698 | B2 * | 8/2021 | Munechika | B60N 2/665 |
| 2005/0177952 | A1 * | 8/2005 | Wilkinson | A47C 27/18 5/713 |
| 2006/0217644 | A1 * | 9/2006 | Ozaki | A61H 9/0078 601/150 |
| 2013/0187419 | A1 * | 7/2013 | Worlitz | B60N 2/976 297/217.1 |
| 2017/0028163 | A1 * | 2/2017 | Onuma | B60N 2/914 |
| 2018/0086238 | A1 * | 3/2018 | Onuma | B60N 2/976 |

* cited by examiner

MOTOR VEHICLE SEAT

CROSS REFERENCE TO RELATED APPLICATIONS

This patent application claims priority on and the benefit of German Patent Application No. 10 2021 110 529.3 having a filing date of 24 Apr. 2021.

BACKGROUND OF THE INVENTION

Technical Field

The invention relates to a motor vehicle seat having a seat massage system which has one, or a plurality of, fluid-fillable massage bladder(s), and having a cushion which comprises a first side facing the seat occupant and a second side opposite the first side, the massage bladder(s) being arranged on the second side of the cushion such that filling the massage bladder(s) causes a pressure of the filled massage bladder(s) on pressure regions of the cushion and thus a deformation of the cushion.

Prior Art

A generic motor vehicle seat is known, for example, from DE 10 2019 206 830 A1. Such seats have a seat massage system, as shown in a simplified manner in FIG. 1 and FIG. 2, which is generally operated via a plurality of fluid-fillable, in particular air-fillable, bladders 51-54. These are usually supported on a support plate 4 as a counter bearing. The motor vehicle seat or the seat massage system has a cushion 1 which has a first side A (also referred to as the A-side) and a second side B (also referred to as the B-side). In the example shown here, the travel direction is indicated by X. The example pictured shows the cushion 1 of the backrest of a motor vehicle seat and the invention also works exactly in this way albeit for the cushion of the seat part of a motor vehicle seat. Thus, when cushion 1 is mentioned in the following, this applies equally to the cushion of a backrest of a motor vehicle seat and also to the cushion of the seat part of a motor vehicle seat. In any case, the A-side is the side which faces the vehicle occupant sitting in the motor vehicle seat, while the B-side of the cushion is the side opposite to the A-side. FIG. 1 shows that the bladders 51-54 are arranged between the support plate 4 and the cushion 1 and that they are supplied with fluid, preferably air, via a line 3 and a controllable valve block 2 or the like. Thus, it is possible to also control individual bladders 51-54 individually.

If a bladder 51-54 is filled with fluid, said bladder expands in the direction of the B-side of the cushion 1 since it is held back by the support plate 4 in the other direction; this ensures that the cushion 1, when it is preferably a foam material or the like, is deformed locally in the region of the filled bladders 51-54. As can be seen in FIG. 2 in which the bladders 51 and 53 are filled with air, there is, on the A-side relative to a reference line L which represents the undeformed cushion 1, a bulge or swelling 1*a* or 1*b* locally on the A-side of the cushion 1. These local bulges 1*a* or 1*b* are then felt by the vehicle occupant as a massage simulation.

Since the cushion material is generally a material which is compressed by the bladder 51-54 filled with fluid, a large part of the pressure action of each massage bladder 51-54 goes into the deformation of the cushion, and not only in the direction of the vehicle occupant but also in directions which are perpendicular thereto. In other words, some of the forces exerted by the bladders 51-54 do not reach the vehicle occupant.

BRIEF SUMMARY OF THE INVENTION

The problem addressed by the present invention is therefore that of providing a motor vehicle seat having a seat massage system of the type mentioned at the outset but without the described disadvantages.

The problem is solved by a motor vehicle seat having a seat massage system having a seat massage system which has one, or a plurality of, fluid-fillable massage bladder(s), and having a cushion which comprises a first side facing the seat occupant and a second side opposite the first side, the massage bladder(s) being arranged on the second side of the cushion such that filling the massage bladder(s) causes a pressure of the filled massage bladder(s) on pressure regions of the cushion and thus a deformation of the cushion, characterized in that at least one of the pressure regions is surrounded by a recess present in the cushion. Advantageous embodiments can be found in the dependent claims.

The motor vehicle seat according to the invention has a seat massage system which has one, or a plurality of, fluid-fillable massage bladder(s). The motor vehicle seat further has a cushion which comprises a first side facing the seat occupant and a second side opposite the first side. The massage bladder(s) is/are arranged on the second side of the cushion such that filling the massage bladder(s) causes a pressure of the filled massage bladder(s) on pressure regions of the cushion and thus a deformation of the cushion. These pressure regions are preferably regions of the cushion with which the used massage bladders come into direct contact because the massage bladder abuts the cushion at the very least when the seat massage system is switched on but also when the seat massage system is switched off, specifically when at least one of the massage bladders is filled with a fluid.

According to the invention, at least one of the pressure regions is surrounded by a recess present in the cushion.

This results in a whole range of advantages. As a result, when the filled massage bladders put pressure on a corresponding pressure region surrounded by a recess, this pressure region is initially deformed, and indeed is compressed substantially in the direction of the A-side of the cushion.

Regions of the cushion which are not in direct contact with each massage bladder are largely bypassed since the recess ensures that forces exerted on the cushion by the filled massage bladder only cause a deformation of the cushion material in the region which is left empty by the recess. In this way, the compressive force of the filled bladder can be directed in the direction of the A-side of the cushion in a substantially targeted manner. As a result, the massage experience which the seat occupant feels is improved in comparison with known solutions because the force of the massage bladders is not partly introduced into adjacent regions of the cushion. Preferably, the cushion comprises a foam part or is formed as a foam part. This material makes processing and production particularly simple and has already proved its usefulness for seat upholstery in the past.

The pressure regions can be formed basically in one piece with the cushion. Preferably, however, at least one of the pressure regions can be formed as a separate part, preferably from a material which is softer than the material of the cushion, and inserted into the corresponding recess of the cushion. Such a separate part can consist of the same material as the surrounding cushion or it can be a material which is different from the material of the cushion. According to a preferred embodiment, the material of such a pressure region formed as a separate part is softer than the cushion material, for example by said material of the pressure region having a compressive strength which is lower than the cushion. Thus, the compressive force of the massage bladder is increased in the direction of the A-side.

In order to increase the compressive force of the massage bladder in the direction of the A-side, alternatively or additionally the massage bladder(s) can be arranged between the second side of the cushion and a support device used as a counter bearing.

The recess according to the invention can be formed in a different way. Preferably, the recess is a groove or slot of which the depth direction is oriented in the direction of the first side. When selecting foam as the material, such a groove or slot can in particular be cut into the material afterwards. Of course, it is also possible to take this into account and shape said groove or slot during the molding process of the cushion.

In order to ensure that the deformation of a pressure region does not take adjoining regions of the cushion with it or compressive forces of the massage bladder are not introduced into adjoining regions, the recess can have a closed shape in that said recess fully extends around the massage bladder(s). A free space is thus created around the pressure region deformed by each massage bladder when pressure is applied, into which free space some of the pressure region can escape during compression of the pressure region such that no contact or only a small amount of contact with the rest of the cushion occurs.

According to a particular embodiment of the present invention, the recess can be designed such that a massage bladder, which pushes against the pressure region of the cushion surrounded by the recess when said massage bladder is filled, is at least partly surrounded by the material of the cushion. In this way, it is possible that the massage bladder at least partly dips into a recess in the cushion and thus comes nearer to the first side. This additionally increases the effectiveness of the massage.

In order to fill the massage bladder(s) with fluid, air is preferably provided; other fluids such as liquids or gases can also be used.

The massage experience can be improved further according to a preferred embodiment of the present invention if special pressure portions are also provided on the A-side. Preferably, pressure portions, which are opposite the pressure regions present on the second side, are arranged on the cushion on the first side. The deformation of the cushion by the massage bladders and the accompanying compressive force, which is transferred from the expanding massage bladder via each pressure portion and through the cushion to the A-side and finally to the seat occupant, can be increased by additional pressure elements on the first side opposite each pressure portion. These pressure portions are preferably formed from a material which has a greater strength, in particular compressive strength, than the material of the cushion. In a different embodiment, these pressure portions can merely be small regions which exert a pressure on the vehicle occupant at certain points. In such an embodiment, the pressure portions can also be grooves or slots or the like shaped in the material of the cushion on the first side.

Similarly to the second side, the region around the pressure portions can also be cut on the first side such that a recess is arranged around the pressure portions when pressure is not applied; in principle, this recess can have the same properties as the recess described above. The pressure portions are then preferably surrounded by a recess present in the cushion on the first side. As a result, when a bladder is filled, the corresponding pressure portion opposite the then compressed pressure region on the first side experiences an additional lift because the recess is a material weakening which allows a higher deformation in the region of the material weakening.

In comparison with known solutions, the present invention clearly improves the massage experience for the seat occupant.

BRIEF DESCRIPTION OF THE DRAWINGS

In the following, the invention is explained in more detail with reference to embodiments.

DETAILED DESCRIPTION OF PREFERRED EMBODIMENTS

Figure 1:
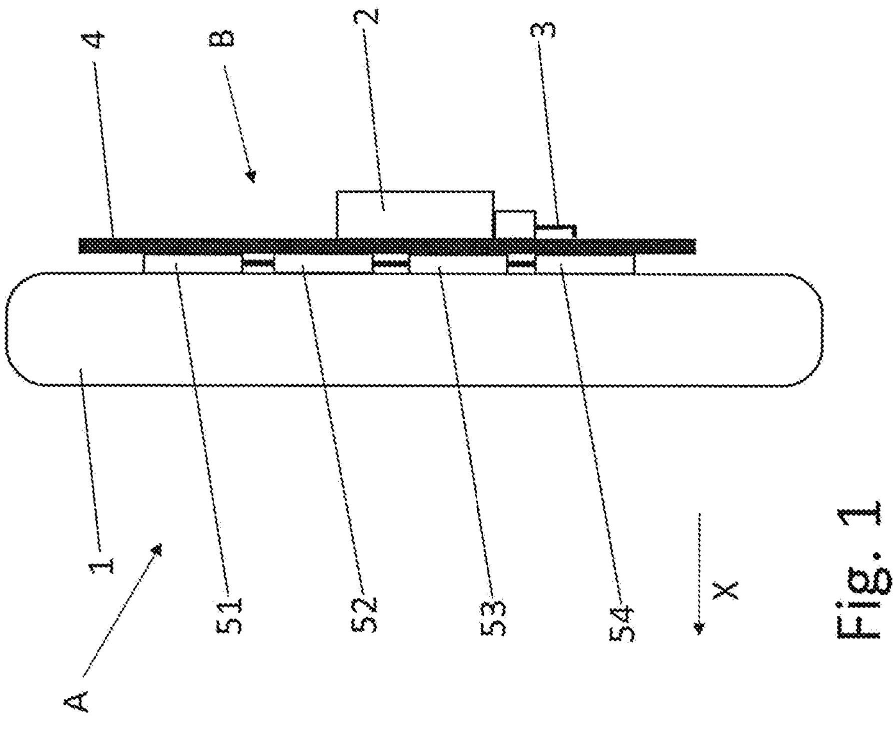
Fig. 1 Prior Art
FIG. 1 shows a sectional view through a seat massage system according to the prior art having a switched-off massage apparatus.
Figure 2:
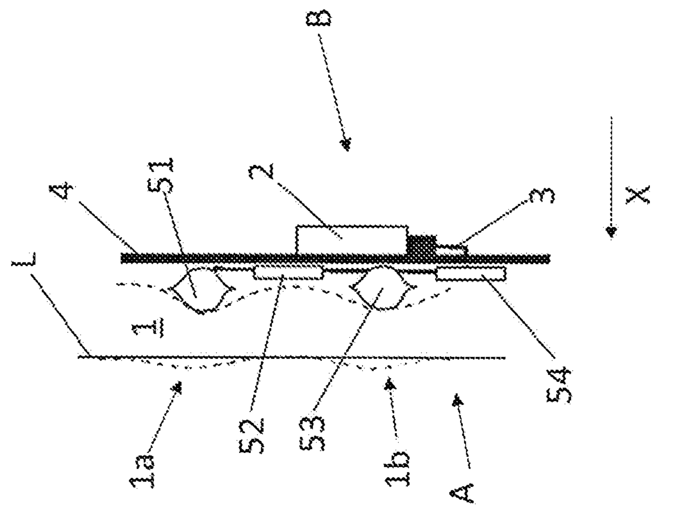
Fig. 2 Prior Art
FIG. 2 shows the seat massage system in FIG. 1 having a switched-on massage apparatus.

In FIGS. 1 and 2 discussed at the outset, individual features have already been discussed using certain reference signs. Where the same reference signs are used in FIGS. 3-8, the statements made above apply accordingly and reference is made thereto to avoid repetition.

The embodiments illustrated in FIGS. 3-8 are parts of the motor vehicle seat according to the invention which is not shown in more detail here for reasons of clarity.

Figure 4:
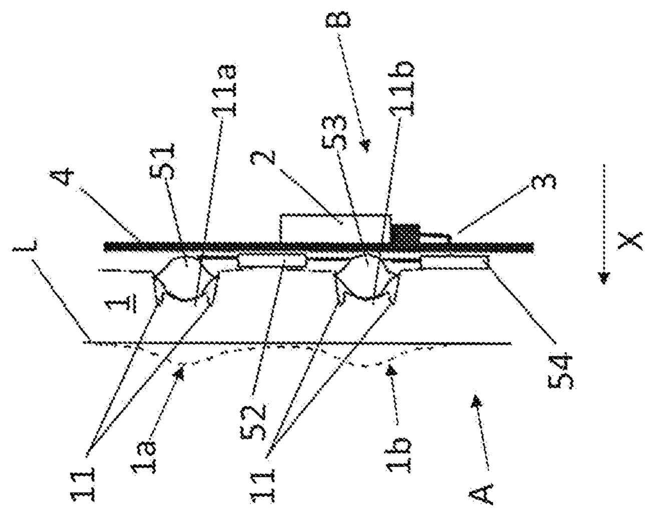
FIG. 4 shows the seat massage system illustrated in FIG. 3 having a switched-on massage apparatus.
Figure 3:
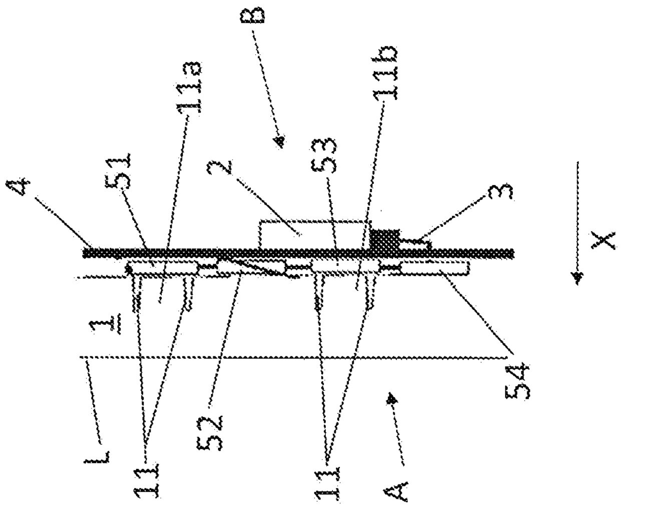
FIG. 3 shows a sectional view through a seat massage system used in the motor vehicle seat according to the invention having a switched-off massage apparatus according to a first embodiment.

In the embodiment shown in FIGS. 3 and 4, the pressure regions 11*a* and 11*b* can be seen in the sectional drawings; in the example shown, the massage bladders 51 and 53 abut said pressure regions. In the section shown, the portions, indicated by 11, of the recess according to the invention which preferably fully surrounds the pressure regions 11*a* and 11*b* can be seen on both sides of the pressure regions 11*a* and 11*b* of the cushion 1 in each case. By means of a corresponding control apparatus 2 which can contain a valve block, a massage program is started and thus the massage bladders 51-54 according to a certain specification are filled with a fluid, in particular air. In the example shown in FIG. 4, when the massage bladders 51 and 53 are filled, they are squeezed by the support plate 4, start to bulge and in turn exert pressure on the pressure regions 11*a* and 11*b*. The pressure regions 11*a* and 11*b* are deformed as a result and partly push into the region of the recess 11. At the same time, as shown in FIG. 4 by way of the dashed line, deformations

1*a* or 1*b* are formed on the A-side opposite the pressure regions 11*a* and 11*b* lying on the B-side.

Figure 6:
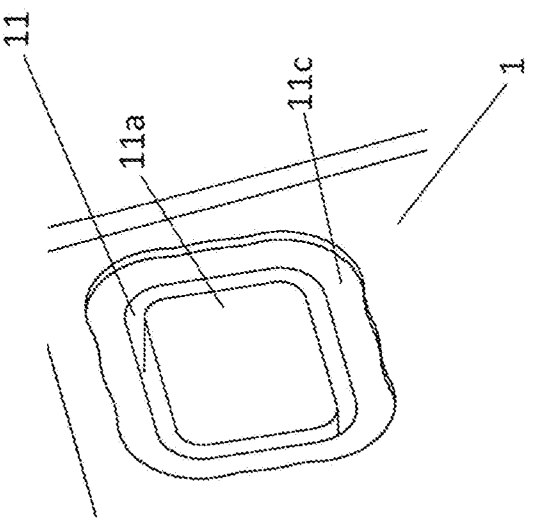
FIG. 6 shows an enlarged cutout view of the detail D from FIG. 5.
Figure 5:
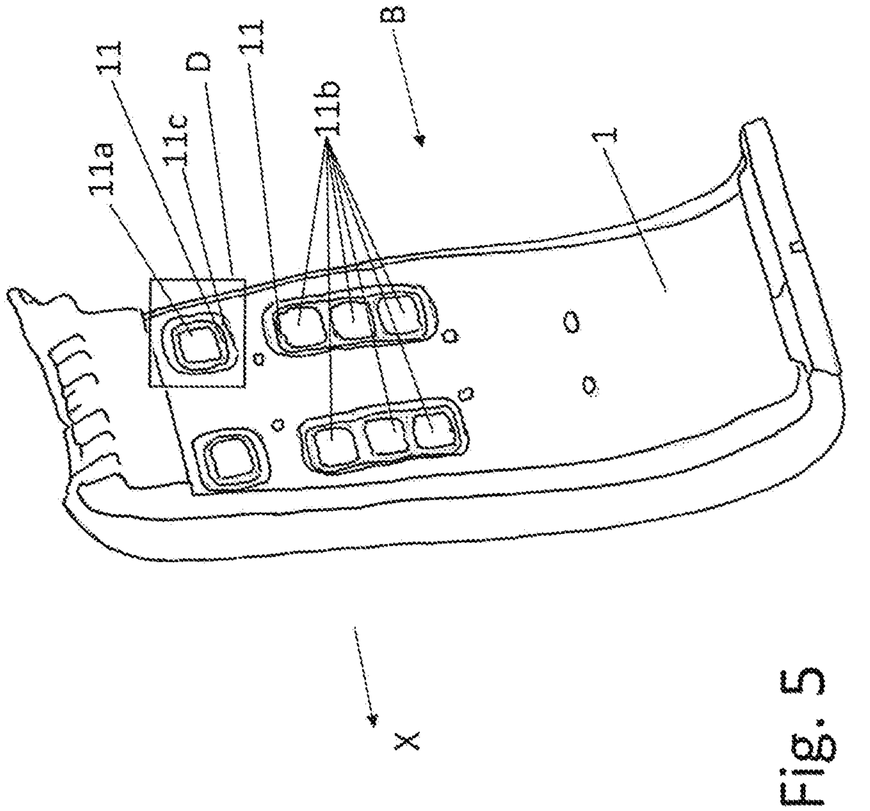
FIG. 5 shows a perspective view of a cushion used in the present invention from the B-side.

In FIGS. 5 and 6, the B-side is explained by way of a preferred embodiment. Here, it is merely intended to be shown that a large amount of pressure regions 11*a* and 11*b* can be formed on the B-side of the cushion 1. Representative of this, one of the pressure regions 11*a* and the region of the cushion 1 around said pressure region is shown in FIG. 6. As can be seen, the recess 11 fully extends around the pressure region 11*a* here. In FIG. 5, it is also indicated that, under certain circumstances, a recess 11 can extend around a plurality of pressure regions 11*b*. Preferably, a set-back part 11*c* can also be provided in the cushion 1 on the side of the recess 11 facing away from the pressure region 11*a*. This can be used to accommodate the flat massage bladders, i.e., the massage bladders 51-54 not filled with fluid, such that they can be accommodated flush to the B-side in the cushion 1 when they are not filled.

Figure 8:
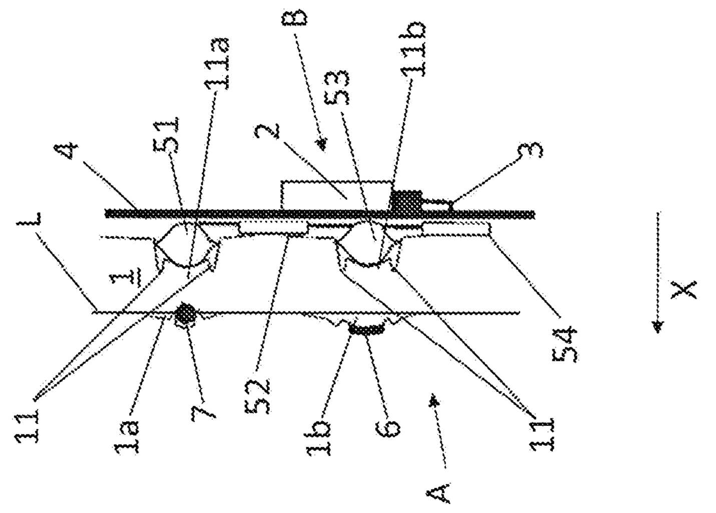
FIG. 8 shows the seat massage system illustrated in FIG. 7 having a switched-on massage apparatus.
Figure 7:
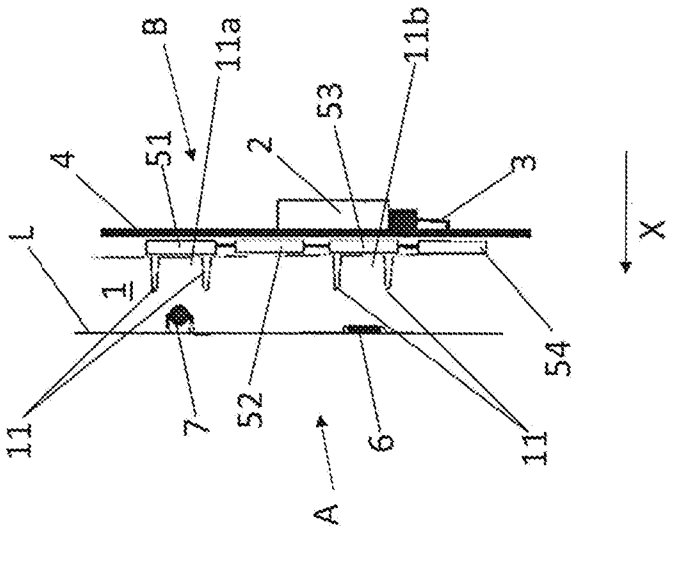
FIG. 7 shows a sectional view through a seat massage system used in the motor vehicle seat according to the invention having a switched-off massage apparatus according to a second embodiment.

A further embodiment according to the invention is shown in FIGS. 7 and 8. The drawings and views shown therein substantially correspond to FIGS. 3 and 4 and therefore reference is also made to the above description. In contrast to the embodiment according to FIGS. 3 and 4, the embodiment shown in FIGS. 7 and 8 has pressure portions 7, 6 on the A-side of the cushion. Theoretically, only one single pressure portion can be provided. These pressure portions 7, 6 are in the regions on the A-side which would be deformed by pressure from the massage bladder 51 or 53 on the pressure regions 11*a* or 11*b*. In order to generate a massage experience which can be felt even better by the seat occupant, the pressure portions 7, 6 are formed differently from the rest of the material of the cushion. This can be achieved if stronger or at least compressively stronger materials are used for the pressure portions 7, 6 such that the seat occupant feels a harder pressure on their back at points when pressure of the massage bladders is applied to the pressure regions 11*a* and 11*b*. Of course, it is also possible to form the pressure portions 7, 6 as knobs in the cushion material of the cushion 1. As indicated in FIGS. 7 and 8, recesses can also be formed here in the A-side around the pressure portions 7, 6, similarly to the recesses 11 around the pressure regions 11*a* and 11*b*. The recesses can be made exactly as they are described above. The recesses on the A-side formed around the pressure portions 7, 6 locally increase the deformability of the cushion 1. This means, on the one hand, that a pressure of a massage bladder 51, 53 on the corresponding pressure regions 11*a* and 11*b* leads to a stronger deformation of the regions 1*a* and 1*b* on the A-side, and on the other, that these pressure portions 7, 6 would be pushed into the cushion 1 by the seat occupant when the seat massage system is switched off, i.e., when the massage bladders are not filled, as a result of the force exerted on the cushion 1 by the seat occupant. The latter has the effect that, when the seat massage system is switched off, the pressure portions 7, 6 which reinforce the pressure when the massage is running are not felt as strongly or not felt at all by the seat occupant.

The present invention makes it possible to improve the massage experience of seat massage systems in motor vehicle seats without forfeiting seat comfort when the massage is switched off.

What is claimed is:

1. A motor vehicle seat, comprising:

a seat massage system (2, 3, 51-54) which has at least one fluid-fillable massage bladder (51-54), a cushion (1) which comprises pressure regions (11*a*, 11*b*), a first side (A) configured to face a seat occupant, and a second side (B) opposite the first side (A), and a recess (11) in the cushion (1), wherein the recess (11) is a groove or slot defining the pressure regions (11*a*, 11*b*), and wherein at least one of the pressure regions (11*a*, 11*b*) is surrounded by the recess (11), wherein a portion of the cushion (1) that is located within the pressure regions (11*a*, 11*b*) is deformable and includes a protrusion that is surrounded by the groove or slot which separates an outer wall of the protrusion from the rest of the cushion, wherein the at least one massage bladder (51-54) is arranged on the second side (B) of the cushion (1) such that filling the at least one massage bladder (51-54) with a fluid causes a pressure of the at least one massage bladder (51-54) filled with a fluid on the pressure regions (11*a*, 11*b*) of the cushion (1) and thus a deformation (1*a*, 1*b*) of the portion of the cushion (1) within the pressure regions (11*a*, 11*b*).

2. The motor vehicle seat according to claim 1, wherein the cushion (1) comprises a foam part or is formed as a foam part.

3. The motor vehicle seat according to claim 1, wherein at least one of the pressure regions (11*a*, 11*b*) is formed from a material which is softer than the material of the cushion (1), and which is inserted into the corresponding recess of the cushion.

4. The motor vehicle seat according to claim 1, wherein the at least one massage bladder (51-54) is arranged between the second side of the cushion (1) and a support device (4) used as a counter bearing.

5. The motor vehicle seat according to claim 1, wherein the groove or slot that defines the recess (11) has a depth direction that is oriented in a direction towards the first side (A).

6. The motor vehicle seat according to claim 1, wherein the recess (11) has a closed shape in that said recess fully extends around the at least one massage bladder (51-54).

7. The motor vehicle seat according to claim 6, wherein the recess (11) is designed such that the at least one massage bladder (51), which pushes against the pressure region (11*a*; 11*b*) of the cushion surrounded by the recess (11) when said the at least one massage bladder (51) is filled, is at least partly surrounded by the material of the cushion (1).

8. The motor vehicle seat according to claim 1, wherein air is provided for filling the at least one massage bladder (51-54) with a fluid.

9. The motor vehicle seat according to claim 1, wherein pressure portions (7, 6), which are opposite the pressure regions (11*a*, 11*b*) present on the second side (B), are arranged on the cushion (1) on the first side (A).

10. The motor vehicle seat according to claim 9, wherein the pressure portions (7, 6) are formed from a material which has a greater compressive strength than the material of the cushion (1).

11. The motor vehicle seat according to claim 10, wherein the pressure portions (7, 6) are surrounded by a recess (11) present in the cushion (1) on the first side.

12. The motor vehicle seat according to claim 9, wherein the pressure portions (7, 6) are surrounded by a recess (11) present in the cushion (1) on the first side.

* * * * *